(12) United States Patent
Chaney

(10) Patent No.: US 10,802,175 B2
(45) Date of Patent: Oct. 13, 2020

(54) COAXIAL REFLECTOMETER SENSOR ELEMENTS

(71) Applicant: Reeves Wireline Technologies Limited, Leicestershire (GB)

(72) Inventor: Darren Chaney, Leicestershire (GB)

(73) Assignee: REEVES WIRELINE TECHNOLOGIES LIMITED, Leicestershire (GB)

( * ) Notice: Subject to any disclaimer, the term of this patent is extended or adjusted under 35 U.S.C. 154(b) by 81 days.

(21) Appl. No.: 16/215,926

(22) Filed: Dec. 11, 2018

(65) Prior Publication Data

US 2019/0187320 A1   Jun. 20, 2019

(30) Foreign Application Priority Data

Dec. 20, 2017   (GB) .................................. 1721475.0

(51) Int. Cl.
*G01V 3/30* (2006.01)
*G01V 3/34* (2006.01)
(Continued)

(52) U.S. Cl.
CPC .............. *G01V 3/30* (2013.01); *E21B 47/113* (2020.05); *E21B 47/13* (2020.05); *G01V 3/34* (2013.01)

(58) Field of Classification Search
CPC ...... E21B 47/00; E21B 47/122; E21B 49/005; G01N 33/2823; G01N 33/0031;
(Continued)

(56) References Cited

U.S. PATENT DOCUMENTS 2,941,933 A * 6/1960 Roake ...................... G21C 3/04
                                                                228/155
3,227,800 A * 1/1966 Bondon ............. H01B 11/1847
                                                                174/29

(Continued)

FOREIGN PATENT DOCUMENTS

GB          2166249 A      4/1986

OTHER PUBLICATIONS

Uk Search Report received in copending UK Application No. GB1721475.0 dated Jun. 20, 2018, 1 page.

*Primary Examiner* — Tung X Nguyen
*Assistant Examiner* — Robert P Alejnikov, Jr.
(74) *Attorney, Agent, or Firm* — Blank Rome LLP

(57) ABSTRACT

A reflectometer sensor element comprises (i) a recess formed in an electrically conducting material, the electrically conducting material defining a connection portion; the recess including an open end at or adjacent a surface of the electrically conducting material; and a transverse cross-sectional area defined by at least one wall of the recess increasing in at least a first region between the connection portion and the open end; (ii) an electrically conducting electrode that is spaced from the said at least one wall of the recess and extends between the open end and a location proximate the connection portion; and (iii) one or more dielectric materials occupying at least part of the recess between the at least one wall of the recess and the electrically conducting electrode. Such an element allows the detection of signals reflected from deeper within subterranean rock than has previously been possible.

15 Claims, 3 Drawing Sheets

(51) Int. Cl.
*E21B 47/13* (2012.01)
*E21B 47/113* (2012.01)

(58) Field of Classification Search
CPC ...... G01R 27/2617; G01V 3/08; G01V 3/081;
G01V 3/12; G01V 3/18; G01V 3/20;
G01V 3/26; G01V 3/28; G01V 3/30;
G01V 3/34
USPC .......................... 324/324, 338–351, 355, 356
See application file for complete search history.

(56) References Cited

U.S. PATENT DOCUMENTS

| | | | | |
|---|---|---|---|---|
| 4,158,185 | A * | 6/1979 | Dageforde | H01B 5/108 |
| | | | | 333/243 |
| 4,873,488 | A * | 10/1989 | Barber | G01V 3/28 |
| | | | | 324/339 |
| 6,081,116 | A * | 6/2000 | Wu | G01N 24/081 |
| | | | | 324/300 |
| 8,579,825 | B2 * | 11/2013 | Tenerz | A61M 25/09 |
| | | | | 600/488 |
| 2013/0104642 | A1 * | 5/2013 | Pelletier | G01V 3/30 |
| | | | | 73/152.47 |

\* cited by examiner

COAXIAL REFLECTOMETER SENSOR ELEMENTS

FIELD OF THE DISCLOSURE

The subject matter of the present disclosure concerns improvements in or relating to coaxial reflectometer sensor elements.

Such elements are useful inter alia in downhole logging operations in the determination of the relative permittivity or dielectric constant of rock.

Logging techniques are used extensively in the mining and oil/gas industries to help locate formations containing various substances. Logging is also used when prospecting for e.g. underground water or when assessing features that may affect the stability, strength, hardness, porosity, or other parameters of rock. Such assessments are beneficial when preparing to recover hydrocarbons, water, and minerals, or when preparing for tunnelling or construction work. The last-mentioned may relate to the creation of above-ground or subterranean structures the latter including but not being limited to underground storage facilities.

The subject matter of the present disclosure is of utility in all such endeavours.

BACKGROUND OF THE DISCLOSURE

As is well known, prospecting for minerals of commercial or other value (including but not limited to hydrocarbons in liquid or gaseous form; water e.g. in aquifers; and various solids used e.g. as fuels, ores or in manufacturing) and assessing rock properties as aforesaid are economically and technically important and challenging activities. For various reasons those wishing to extract minerals and other substances from below the surface of the ground or beneath the floor of an ocean need to acquire as much information as possible about both the potential commercial worth of the minerals in a geological formation and also any difficulties that may arise in the extraction of the minerals to surface locations at which they may be used. Those wishing to assess the strength, stability, etc of rock have comparable information needs.

For these and related reasons over many decades techniques of logging of subterranean formations have developed for the purpose of establishing, with as much accuracy as possible, information about subterranean conditions. Logging also is used for other purposes as summarized above.

Most prior art logging techniques involve the emission of energy into the rock of interest that has been penetrated by e.g. a borehole, using a transmitter forming part of an elongate logging tool. In prior art logging tools detection of energy that has passed through the rock then takes place using one or more receivers at locations along the logging tool that are spaced from the transmitter. The aim of such an arrangement is to try and detect only the energy that has passed through the rock, and not energy adopting transmission paths that avoid the rock or only minimally penetrate it. Changes in the detected energy may then be interpreted to provide values of physical quantities that are indicative of various properties of and conditions in the rock.

In use of most known designs of logging tool the tool is conveyed to a particular depth along the borehole, which may be at or near its "total depth" (i.e. the furthest downhole extremity along the borehole from the surface location at which the borehole terminates at its uphole end) but this need not be so and the logging tool can be usefully conveyed to in practice any depth along the borehole as desired. The tool in use is drawn from such a downhole location towards the surface termination of the borehole. The logging tool records log data at a series of logging depths on its travel along the borehole. Depending on the exact style of logging under consideration, logging may take place either when the logging tool is moving in a downhole direction, or when it is moving in an uphole direction. The subject matter of the present disclosure as defined herein is not limited to any particular direction of movement or mode of conveyance of the logging tool.

As used herein "logging depth" refers to the location along the borehole, measured from the uphole end, at which a particular logging activity takes place. Most logging tools (or apparatuses associated with them) are able to record or indicate the depth along the borehole at which each logging action occurs, and this information is included in data logs when these are created, transmitted, recorded, stored, printed, or plotted for viewing. A logging tool may detect and record many hundreds or thousands of data sets during its travel along the borehole and usually it is important to identify the location in the borehole at which each batch of data is acquired.

Although extensive reference is made herein to "depth" as a measure of distance along a borehole, it should be understood that boreholes drilled or otherwise formed in rock for purposes such as logging, mineral recovery, water recovery, hydrocarbon recovery and rock property evaluations do not necessarily extend entirely or even (in some cases) appreciably vertically. Thus, the terms "logging depth" and derivatives include measures of distance along a borehole, in general.

Terms such as "depth of penetration," "depth of investigation" and derivatives, in contrast, refer to the distance from a borehole into the rock over which a particular log contains useful information about the rock. Thus, in the case of a prior art energy-emitting logging tool having spaced receivers for receiving transmitted energy, the depth of penetration is a measure of the extent to which the emitted energy spreads into the rock before returning to the receiver section of the logging tool.

The terms "uphole," "downhole" and derivatives are familiar to those of skill in the borehole logging art and do not require further explanation herein.

Values of dielectric constant (relative permittivity) are of interest in logging in part because such values are distinctive depending on the fluid contained in pores in the rock. This is of potential benefit in determining whether the rock pores contain water, oil, gas, or a mixture of these fluids.

In particular, it is known that the dielectric constant of liquid hydrocarbons, especially oil, is in the approximate range 1-3; that of rock is in the approximate range 4-10; and that of water is in the approximate range 56-80. An accurate measure of dielectric constant can provide a direct indication of the make-up of fluids (including fluid mixtures) in the rock pores. Different mixtures of fluids can influence the dielectric constant to a variable extent; and the measured value also may be influenced by the rock type.

This is an advantage of a dielectric constant measurement over for example a resistivity measurement that, while widely used in logging technologies, can be ambiguous when seeking to distinguish between rock-borne water and rock-borne hydrocarbons. This is particularly the case when the water in the formation is of low or zero salinity, the problems of resistivity measurement ambiguity however tending to diminish with increasing salinity of any water in the pores of the rock.

Energy emission techniques as outlined above have been used in the prior art for the purpose of establishing the dielectric constant or relative permittivity of rock surrounding a borehole. However, such techniques hitherto have not proved popular among logging engineers and analysts. This is believed to be because emitted energy signals from which it is suitable to derive permittivity values tend not to travel far into the rock surrounding a borehole as they pass from transmitter to receiver elements forming part of a logging tool. Moreover, such signals can be adversely influenced by non-rock features such as layers of mudcake, the nature of which is known to those of skill in the art. As a result, the signals generated by emitter-receiver logging tools intended to measure permittivity tend to contain little information about the geology, etc., of the rock.

In consequence many rock permittivity measuring devices often are only used in laboratory environments to which rock samples are conveyed after their removal from a borehole. This for various reasons is sub-optimal.

Even in prior art permittivity-measuring logging tools that can be used in downhole environments the useful information in the signals often is dominated by noise, unwanted harmonics of desired signals, the effects of direct transmission paths not passing through the rock, reflections and so on. In this regard the receiver elements normally are antennae that are tuned to resonate at frequencies typical of the transmitted energy and therefore are prone to the indicated drawbacks. Such problems are generally familiar to those of skill in the logging art, and do not require describing in detail herein.

Patent application no GB 1518353.6, the disclosure of which is incorporated herein by reference in its entirety, describes apparatuses and methods, for establishing formation permittivity values, that address problems of the kind summarised above. GB 1518353.6 discloses various apparatuses for evaluating microwave electromagnetic energy that is detected at an interface between a sensor and e.g. the wall of a borehole or the surface of mudcake formed on the interior of a borehole. The energy detected and measured by the apparatuses of GB 1518353.6 allows the derivation of permittivity information at a considerable depth into the rock without having to establish an energy transmission path, between an emitter and a receiver, taking in all the rock of interest.

One form of apparatus disclosed in GB 1518353.6 may operate in a reflection mode, in which energy is reflected at the aforesaid interface in a manner that indicates the dielectric constant/relative permittivity of rock surrounding the apparatus. In the case of the apparatus of GB 1518353.6 used in a reflection mode the depth of investigation is a measure of the distance into the rock over which the detected energy signals indicate characteristics, such as the dielectric constant or relative permittivity, of the rock.

Such apparatus employs a number of "probes," i.e. sensor elements that are capable of detecting the reflected signals and generating e.g. electrical log signals in dependence on them.

U.S. Pat. No. 7,327,146 describes an open-ended coaxial sensor element that is intended for downhole use.

U.S. Pat. No. 4,626,773 describes a similar sensor element that is suitable for use in a laboratory environment. Further aspects of the use of laboratory sensor elements to determine relative permittivity values are disclosed in the documents, "*Dielectric metrology with coaxial sensors*", Gregory & Clarke, 20 Mar. 2007; "*DAK—Dielectric Assessment Kit Product Line*" published by Schmid & Partner Engineering AG and available at https://www.speag.com/products/dak/dielectric-measurements/; and "*Broadband Dielectric Measurement Methods for Soft Geomaterials: Coaxial Transmission Line Cell and Open-Ended Coaxial Probe*", Chen et al, IACSIT International Journal of Engineering and Technology, Vol 6, No 5, October 2014.

SUMMARY OF THE DISCLOSURE

In embodiments disclosed herein, there is provided a reflectometer sensor element comprising (i) a recess formed in an electrically conducting material, the electrically conducting material including a connection portion; the recess including an open end, at or adjacent a surface of the electrically conducting material, that is longitudinally spaced from the connection portion; and the recess having a transverse cross-sectional area, defined by at least one wall of the recess, that increases in at least a first region between the connection portion and the open end; (ii) an electrically conducting electrode that is spaced from the said at least one wall of the recess and extends between the open end and a location proximate the connection portion; and (iii) one or more dielectric materials occupying at least part of the recess between the at least one wall of the recess and the electrically conducting electrode, wherein the recess defines a central, elongate axis and the electrically conducting electrode is an elongate element the elongate axis of which is coaxial with the recess, the sensor element including one or more fluted recesses extending longitudinally along the electrically conducting electrode.

An advantage of the foregoing arrangement over prior art sensor elements is that it makes use of a large diameter (or other transverse dimension) of the open end of the sensor element that maximizes the depth of investigation, while permitting an end of the sensor element that is spaced from the open end to connect to a relatively small diameter coaxial connector.

The impedance of the reflectometer sensor element may beneficially be matched to that of an analyser or other electronics to which it may in use be operatively connected.

The positioning of part of the electrically conducting electrode relative to a connection portion defined in the electrically conducting material means that connection of the reflectometer sensor element to analysing or other electronics capable of generating high frequency signals may readily be achieved using coaxial connector and conductor means, which may be of a per se known kind.

Furthermore, the sensor element of the present disclosure readily copes with the likelihood that the distance between the coaxial connector and the open end of the sensor element may be short as a result of the sensor element being formed in a deployable pad of a logging tool. Such a pad typically is of relatively short transverse dimension, with the result that it is incapable of accommodating many known coaxial reflectometer sensor element designs.

The change in diameter (or other transverse dimension) of the recess may cause unwanted reflections. The presence of flutes extending longitudinally along the electrode has been found beneficially to attenuate the unwanted reflections. This gives rise to a sensor element that is capable of generating signals indicative of rock properties at significant depths of investigation, without the reflection problems that otherwise could arise.

Advantageous, optional features of embodiments are defined in the claims depending from claim 1 hereof.

The electrically conducting electrode may include an outer periphery and may include a plurality of the said fluted recesses spaced at equal intervals about the outer periphery.

The or each said fluted recess preferably is of triangular, V-section, part-circular or ellipsoidal transverse cross-sectional shape, although other flute profiles are also possible within the scope of the present disclosure.

The subject matter of the present disclosure additionally or alternatively is considered to reside in a reflectometer sensor element as defined in the claims hereof wherein the electrically conducting material is electrically connected to and/or forms part of a geological logging tool, especially a pad of a logging tool that in use is forcible into contact with a wall of a borehole formed in subterranean rock. Such a pad may be deployable and retractable in ways known to the person of skill in the art.

The subject matter of the present disclosure further or alternatively is considered to reside in a reflectometer sensor element as defined in the claims hereof when operatively connected to one or more electrical or electronic components that are capable of conditioning, analysing and/or transmitting one or more signals, reflected at the reflectometer sensor element, that are indicative of one or more properties of rock; and also to the use of a reflectometer sensor element as defined herein in the operation of a logging tool to acquire and/or process log information and/or signals indicative of properties of subterranean rock.

BRIEF DESCRIPTION OF THE DRAWINGS

There now follows a description of embodiments of the present disclosure, by way of non-limiting example, with reference being made to the accompanying drawings in which.

DETAILED DESCRIPTION OF EMBODIMENTS

Referring to the figures apparatus 10 for determining the values of properties of layers of or associated with a borehole 11, and a borehole system incorporating such apparatus 10, are illustrated. The borehole 11 is shown extending through part of the Earth's crust in a manner that is familiar to those of skill in logging and related disciplines.

Figure 1:
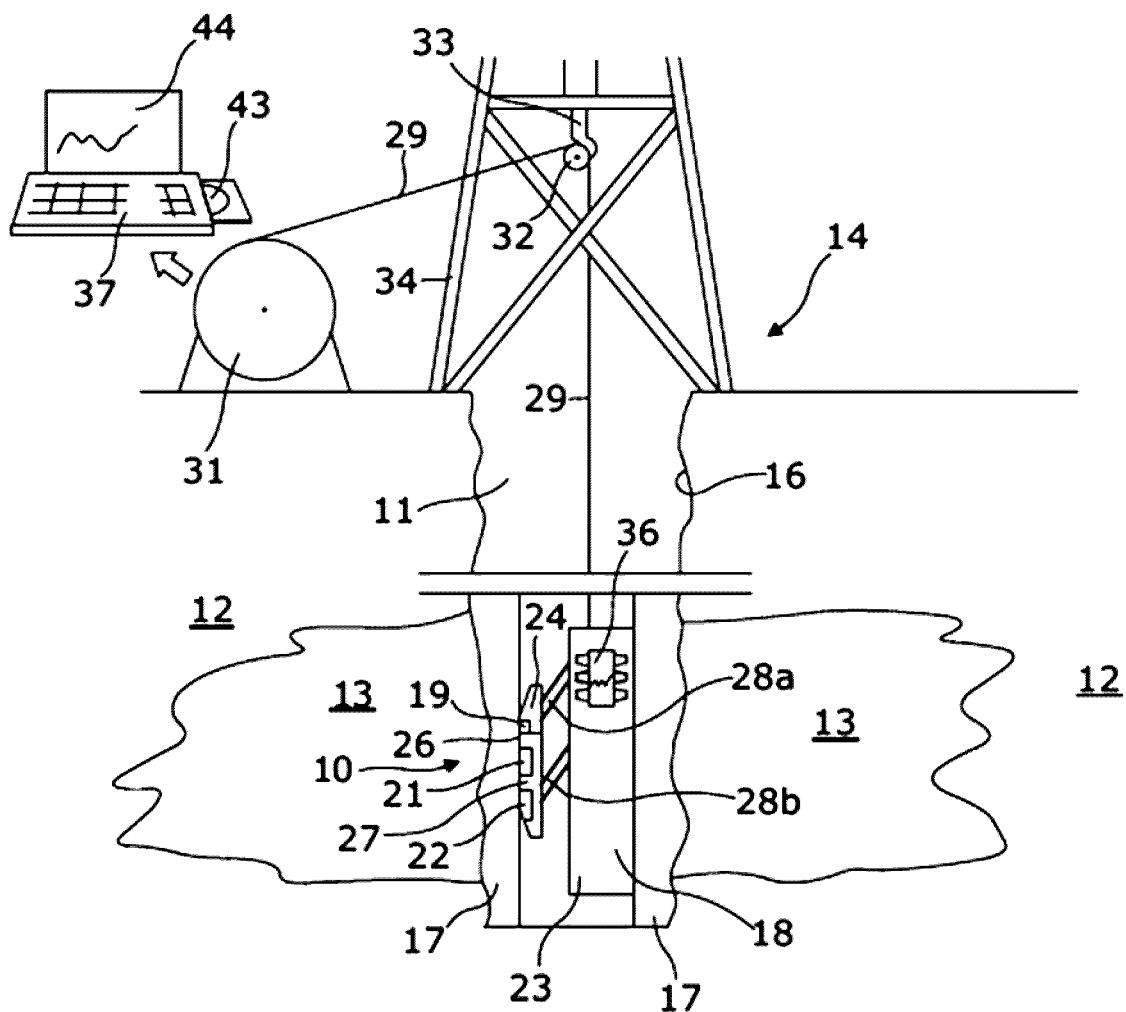
FIG. 1 is an elevational view, not to scale, of a borehole system including apparatus according to the present disclosure.

The borehole 11 is formed in rock 12 e.g. by drilling and may extend for hundreds or thousands of metres or feet, as indicated schematically in FIG. 1. The aim of creating the borehole 11 in the illustrated embodiment is to penetrate a schematically illustrated formation 13 that contains e.g. within pores in the rock 12 a fluid, or mixture of fluids, of interest as exemplified herein. The borehole may have as its primary purpose the exploration of the formation 13 or the extraction of fluid(s) of interest to an uphole, surface location 14. Boreholes such as borehole 11 also may be created and logged for other purposes. Non-limiting examples of such further purposes are also given herein.

Borehole 11 is shown extending essentially vertically downwardly, but this need not necessarily be the case. Thus, inclined and horizontal boreholes are known, as are boreholes the directions of which are not constant along their lengths.

The wall 16 of borehole 11 typically is rugose as schematically shown in FIG. 1.

Over at least part of its length, most typically coinciding with the section of borehole 11 extending through formation 13, the wall 16 of the borehole 11 includes on its radially inner surface a layer 17 of mudcake. This layer in most cases is annular or approximately annular.

As is well known, mudcake forms from chemicals and other components that may be introduced into a borehole e.g. during drilling or at other times. Mudcake typically forms into a layer as a result of the porosity of the rock of a formation such as formation 13. In some cases, mudcake forms over a substantial length of a borehole and in others it extends over only part of the borehole length and/or circumference. The layer 17 of mudcake is shown somewhat schematically in FIG. 1.

The apparatus 10 is or forms part of a logging tool 18 and in the illustrated embodiment includes three sensor elements 19, 21 and 22 although other numbers of sensor elements are possible.

Logging tool 18 includes a rigid, elongate, cylindrical body 23. The sensor elements 19, 21 and 22 are each supported in a pad 24 such as to present respective sensor surfaces or sensor planes for contact with the radially inner surface of the layer of mudcake 17 or the wall 16 defining the radial extremity of the borehole 11.

To this end pad 24 includes a pad surface 26 with which the sensor surfaces or sensor planes of the sensor elements 19, 21, 22 are coterminous. Pad 24 includes an electrically conducting pad body 27 supported by a pair of arms 28a, 28b that each are pivotably secured at one end to the pad body 27 and at the other end to the logging tool body 23. Such an arrangement is well known in subterranean tool design and permits the pad 24 to be moved from a retracted position adjacent the logging tool body 23 to a position offset therefrom as shown in FIG. 1, with the pad 24 remaining essentially parallel to the elongate axis of the logging tool body during movement as aforesaid. Motors or other deployment actuators are provided within the logging tool body 23 for the purpose of effecting powered movement as described.

The logging tool body may include a recess, that is not visible in the figures, for receiving the pad 24 when it lies adjacent the logging tool body 23. Thus, the pad 24 may be arranged to protrude no further than the exterior of the logging tool body 23 when it occupies its retracted position. Such an option is familiar to those of skill in the logging tool art and is useful for protecting the pad 24 and the sensor elements 19, 21, 22 during deployment of the logging tool 18 from a surface location to a location at which logging is to take place.

The sensor elements 19, 21, 22 are spaced from one another in a line extending along sensor pad surface 26. This assures that the sensor elements 19, 21, 22 in use assess the same azimuthal region of the rock 12.

In the illustrated, non-limiting embodiment deployment of the logging tool 18 takes place using wireline 29, although other deployment methods, including but not limited to various wireless methods, are within the scope of the present disclosure. Several such methods are known to the person of skill in the art and therefore are not described in detail herein.

Wireline 29 is very well known in logging and consists of armoured cable that serves the purposes of (a) supporting the mass of a logging tool such as tool 18 against gravity as it is deployed; (b) providing electrical power for powering the logging tool 18 and activating the motors to cause movement of the arms 28a, 28b and hence deployment of the pad 24 to the offset position shown; and (c) permitting the telemetering of signals between the surface location 14 and the logging tool 18. Such signals may include commands sent from the surface location 14 to the logging tool in order to effect one or more control actions (such as but not limited to activation of the motors as aforesaid); data sent from the logging tool 18 to the surface location to indicate the occurrence of one or more events (such as but not limited to correct deployment of the pad 24); and/or log data (signals) sent from the logging tool as a result of operation of the sensor elements 19, 21, 22.

In FIG. 1 the wireline 29 is shown being dispensed from a motorised drum 31. This is one method of several within the scope of the present disclosure by which wireline 29 may be dispensed. In FIG. 1 the drum 31 is fixed at the surface location 14 but in other embodiments it may be mounted in a logging truck of a kind familiar to those of skill in the art or may be deployed in other ways as is known in the art.

In the FIG. 1 arrangement the wireline 29 passes over a pulley 32 forming part of a travelling block 33 of a derrick 34 installed at the surface location 14 at the uppermost end of the borehole 11. As a result, the wireline may readily be dispensed from the drum 31 into the borehole 11 in a manner well known to those of skill in the art.

However as will also be familiar to those of skill in logging disciplines there exist numerous other ways of dispensing wireline so that it may support a logging tool. Such options are within the scope of the present disclosure.

The sensor element 22 is a coplanar waveguide that may be operated in a transmission mode or a reflection mode. The sensor elements 19, 21 are reflectometer sensor elements that are in accordance with the present disclosure and operate in reflection modes.

In general, the apparatus 10 includes one or more generators of high frequency, e.g. microwave electromagnetic energy that can be transmitted at the sensor elements in a manner giving rise to detectable, and depending on the sensor element operational mode transmitted or reflected, energy. The detected energy causes the sensor elements to generate signals e.g. in the form of voltages or currents that are in some way proportional to the magnitude and/or phase of the transmitted or reflected energy at any instant.

The sensor elements 19, 21, 22 are connected, e.g. by way of a wired connection, to such a generator of electromagnetic energy and also to processing apparatus that is capable of calculating properties of the layers of the borehole system in accordance with method steps described herein.

In FIG. 1, two processing apparatuses are shown, being respectively one or more on-board microprocessors 36 or other programmable devices that form part of or at least are supported by the logging tool 18; and one or more remote computers 37 or other remote processing devices. Processing of the signals generated in use of the apparatus also may take place using non-programmable devices such as electronic circuits. These may form part of the logging tool 18 or may be remote therefrom; and may be permanently or non-permanently connected to the other parts of the illustrated apparatus, through wired and/or through wireless connections.

The apparatus 10 may include a combination of on-board and remote processing devices as illustrated; or the processing capability may be provided by a single type of processing apparatus. Typically but not necessarily any on-board processing device such as microprocessor 36 is hard-wired to receive the outputs of the sensor elements 19, 21, 22. Also typically but not necessarily any remote computer 37 or other remote processing device forming part of the apparatus 10 is connected e.g. by way of a wired or wireless connection signified by the arrow in FIG. 1 to the wireline 29 such that signals generated at the sensor elements 19, 21, 22 may be processed in the remote computer 37 or other remote processing device(s). Any such remote devices may be located near to the uphole end of the borehole 11, or may be removed a considerable distance therefrom. As necessary any suitable means may be included for ensuring that the signals transmitted via the wireline 29 are in the correct form for processing in the computer 37.

In some embodiments the processing devices such as microprocessor 36 and remote computer 37 are arranged to process the signals generated by the sensor elements 19, 21, 22 immediately they are created, or with only a short delay. However, it is also possible for the apparatus 10 and/or computer 37 to effect processing of the signals following a delay, that may be of significant duration in some circumstances. Moreover, it is not a requirement that e.g. any remote computer 37 or other processing components forming part of the apparatus 10 is dedicated in function or permanently connected to the remainder of the apparatus; and also, it is not a requirement that any remote computer 37 is constituted as a personal computer as illustrated. Thus, overall the processing means forming part of the apparatus 10 may take a variety of forms, may operate in a variety of ways and may exist in a variety of possible locations.

Figure 2:
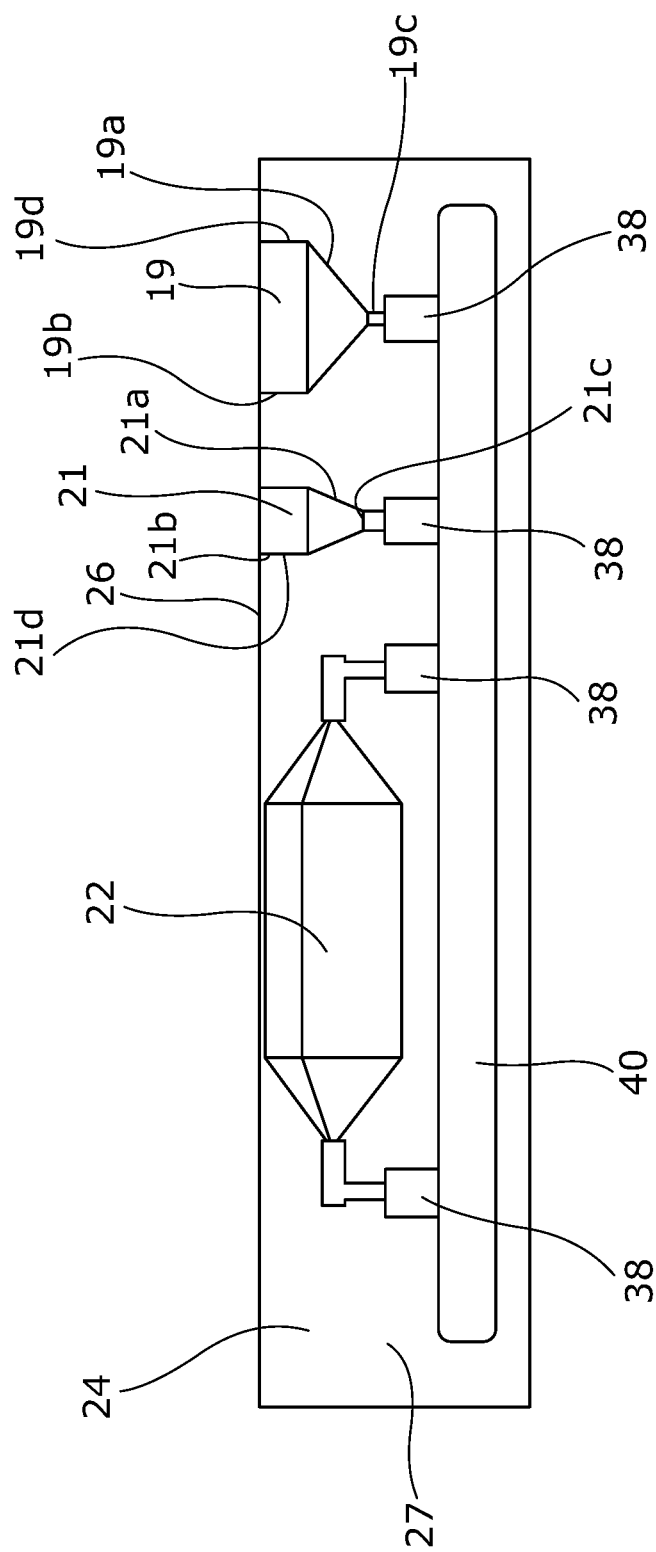
FIG. 2 shows a pad forming part of the FIG. 1 apparatus in more detail.

As best shown in FIG. 2, the sensor elements 19 and 21 are respective open-ended, coaxial reflectometer sensor elements of respectively differing geometries.

The sensor elements 19, 21 include respective hollow, conical or frusto-conical recesses 19a, 21a, that are formed in one or more blocks of electrically conducting material, such as a metal, defining a substrate that in the illustrated embodiment is or forms part of the body 27 of pad 24, although alternative forms of the substrate are possible within the scope of the present disclosure.

The conical or frusto-conical recesses 19a, 21a each terminate in a respective open end 19b, 21b, as illustrated, at or adjacent surface 26 of the electrically conducting material (pad 24). Each of the open ends 19b, 21b is coplanar with pad surface 26 such that when the pad surface 26 is in contact with e.g. the mudcake layer 17 the open ends of the recesses contact the latter to define an interface at which signal reflection may be detected. As noted in use the contact of the pad with the mudcake or borehole wall occurs by pressing or forcing the pad into such contact using the arms 28a, 28b. Various alternative mechanisms are also known in the logging tool deployment art for achieving this effect, and may be used in substitution of the arms 28a, 28b. The subject matter of the present disclosure is not limited to any particular deployment mechanism.

By reason of the (frusto-)conical shape of each recess 19a, 21a the transverse cross-sectional areas defined by the circular walls of the respective recesses each increase uniformly in respective first regions 19a, 21a of the reflectometer sensor elements between connector portions 38 described further below and the open ends 19b, 21b of the sensor elements.

For the avoidance of ambiguity, it is believed possible for the recesses 19a, 21a, to have other shapes than those illustrated, while nonetheless expanding from one end 38 to the respective open end 19b, 21b. In this regard it is possible for example to provide two truncated cones end to end to give an abrupt change in gradient, or a stepped cone. Non-circular cross-sections also are possible although they are unlikely to be as easy to manufacture as circular cross-section recesses.

Each of the recesses 19a, 21a is formed coaxially with an electrically conducting electrode 46 (that is omitted from FIG. 2 for clarity and an example of which is visible in FIG. 3) that extends from the respective cone apex 19c, 21c to the associated open end 19b, 21b. The conducting electrodes 46 extend in particular from the connector portions 38 of each of the reflectometer sensor elements 19, 21 where they are each connected to the centre conductor of a coaxial conductor such as a cable. The wall defining the associated recess 19a, 21a is connected at the connector portions 38 to the outer conductor of the coaxial conductor.

Figure 3:
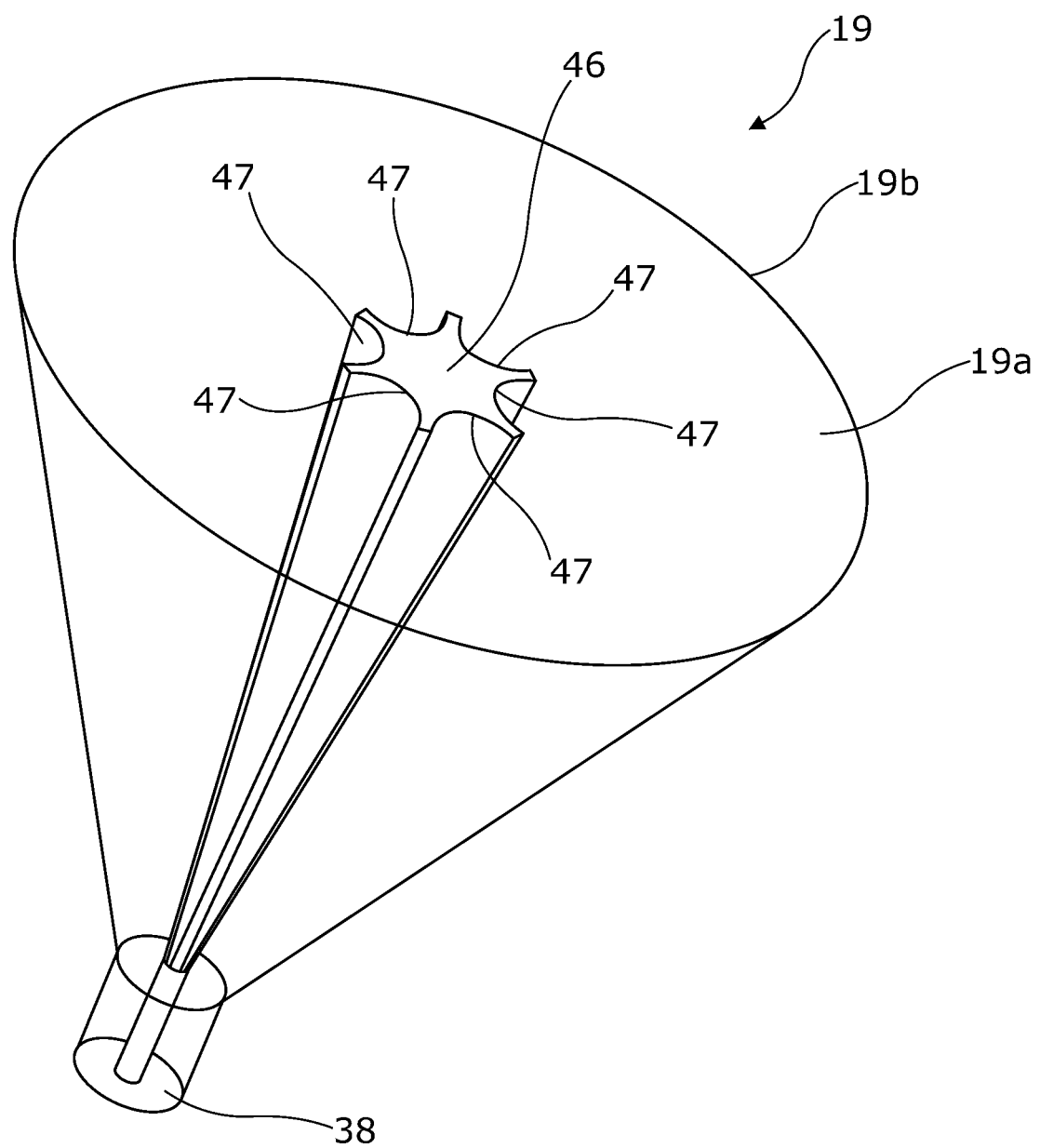
FIG. 3 is a perspective view of one form of reflectometer sensor element according to the present disclosure.

As is visible in FIGS. 2 and 3, the connector portions 38 may be formed as regular, hollow cylinders. Designs of such connector portions that are able to connect to coaxial cables or other coaxial conductors are known per se and are not described in detail herein.

The hollow interiors of the conical recesses 19a, 21a are filled with a dielectric material. In many embodiments of the present disclosure the dielectric material is the same for each of the coaxial reflectometer sensors 19, 21; but it is possible in contrast for mutually differing dielectric materials to be used in other embodiments. A wide range of non-conducting materials is suitable for the dielectrics. Non-limiting examples include glass, various plastics, ceramics, rubber, mica, and epoxies. Mixtures of dielectric materials are possible within the scope of the present disclosure.

In the embodiments illustrated the dielectric material and the coaxial conductor are coterminous with the open ends of recesses 19a, 21a that as mentioned are coplanar with the pad surface 26.

The connector portions 38 are connectable to one or more sources of electromagnetic energy that in use energise the sensor members in radio, microwave, or other high frequencies in order to give rise to detectable energy reflections (sensors 19 & 21 and in some modes of use sensor 22) or transmission (sensor 22) at the sensor elements 19, 21, 22. Such sources may readily be embodied in the electronics section of logging tool 18. Precise details of arrangements for generating the electromagnetic energy required for operation of the apparatus 10 will occur to those of skill in the art and do not need to be described in detail herein.

The connectors 38 also serve as terminals for the connection of one or more analysers of the energy detected at the sensor elements 19, 21, 22 that arises when the logging tool 18 is in use to log part of a borehole 11. As a non-limiting example of an analyser type that may be employed one may consider a vector network analyser or similar device, the operative parts of which also may be housed in an electronics section forming part of the logging tool 18. Typically, but not necessarily, the parts employed for generating and analysing the useful signals exploited in the present disclosure are combined into a single device, or a single section of the apparatus.

The analyzer is capable of conditioning voltage and/or current signals reflected at the sensor open end 19a, 21a. Following such conditioning the resulting energy values may be recorded e.g. in a memory device forming part of the logging tool, and/or they may be transmitted for example by way of wireline 29 if the latter is present. The energy values may be processed e.g. using a processor such as processing device 36 or using a remote processing device such as computer 37.

The conductors in the recesses 19a, 21a thus are electrically connected by way of the connector portions 38 such that detected electromagnetic energy generates voltage or current signals that are indicative of the detected energy magnitude. This is achieved through connection of the connector portions 38 to one or more signal transmission lines 40, illustrated somewhat schematically in FIG. 2, that connect the signal generator, analyser and one or more processing devices 36 and/or 37 in order to permit determination of the properties of material sampled using the sensor elements 19, 21 (and in some method aspects not forming part of the disclosed subject matter, the sensor element 22).

The recess 21a of sensor member 21 has a shallower cone angle than that of recess 19a of sensor member 19. As a result, sensor member 19 reads more deeply into the formation 13 or other layer against which the pad 24 is pressed, in use, by the arms 28a, 28b. In general, a range of cone angles of the sensor element recesses is possible within the scope of the present disclosure.

As shown in FIG. 2 each recess 19a, 21a may include a cylindrical portion 19d, 21d of constant transverse cross-sectional area in a second region extending between each first region 19a, 21a and the associated open end 19b, 21b. This also contains dielectric material. The cylindrical portions 19d, 21d are optional and when present assist in stabilising the dielectric filler.

Sensor member 22 has a different fundamental design than sensor members 19 and 21. In particular, sensor member 22 is formed as an elliptical coplanar waveguide sensor. Examples of this type of sensor are described in detail in GB 1518353.6 and are not described further herein.

It is important in order to avoid unwanted reflections from within the sensor elements 19, 21 for the impedance of each reflectometer sensor element 19, 21 to be matched to that of the analyser.

Typically, however, impedance matching of the sensor element alone is not sufficient to avoid such parasitic reflections. In the sensor element 19 the dimensional change of the aggressively tapered recess 19a may be enough to cause unwanted reflections.

As is apparent from the figures, each of the recesses 19a, 21a defines a central, elongate axis and the electrically conducting electrode 46 is coaxial with this axis and hence with the respective recess 19, 21. The inventor has found that the provision of one or more fluted recesses 47 extending longitudinally along the electrode 46 avoids the problem of unwanted reflections arising because of aggressive tapering of the recesses.

As illustrated the outer periphery of the electrode 46 includes formed therein a plurality of such fluted recesses 47 disposed at equal spacings about the periphery. In the embodiment shown there are six equally spaced fluted recesses 47, but in other embodiments of the present disclosure other numbers of the fluted recesses 47 could be provided.

The profile of each of the fluted recesses 47 is as illustrated part-circular. As noted, triangular, v-section, ellipsoidal and other recess shapes are also possible.

Although the disclosure has been illustrated with reference to a pad 24 supporting three sensors 19, 21, 22, this is purely for purposes of illustrating one way of how one or more reflectometer sensor elements may be defined and supported. The subject matter of the present disclosure is not limited to the illustrated number and combination of sensor elements or the precise choice of substrate shown.

A memory device if provided in the logging tool 18 may be part of or associated with the processing device 36, or it may be a separate component. Composite memory devices are possible in which the memory function is provided by more than one device.

The computer 37 may also include one or more memory devices for similar purposes. Such memory may be provided as on-board memory capacity or an external device such as but not limited to an EEPROM "flash" memory; various other memory types; or a readable/writeable disk such as disk 43 visible in FIG. 1 that may be read and/or written to by the computer 37.

Computer 37 and/or processing device 36 includes and/or is operatively connectable to a display, printer, plotter, or similar device that is capable of reproducing the results of using the apparatus 10 (i.e. log signals) in a form that is interpretable by humans and/or may be machine-read. In the described embodiment a display 44 is provided but it should be noted that this aspect of the present disclosure may take any of a wide range of forms. The display 44, etc., is capable of generating a visual image that is representative of variations in the properties of the rock 12 surveyed by the apparatus. The visual image may be of a kind that can be interpreted by human log analysts; and/or may be of a type that can be interpreted by machines such as computers.

The log data generated by the apparatus 10 however does not need to be in a visually identifiable form, and instead may be stored, transmitted, and/or further processed e.g. as a data file or similar.

The disk 43 may be considered as a non-limiting example, within the scope of the present disclosure, of a computer-readable medium containing instructions for causing a processing device, such as computer 37 or microprocessor 36, to carry out those steps of the methods described herein that involve modelling, calculation, mapping, simulation, minimisation and related steps. Such a medium however may additionally or alternatively take numerous other forms including but not limited to native memory of a computer such as computer 37; native memory of the logging tool 18 (as optionally may be embodied in the microprocessor 36 and/or in separate memory); or in a range of other ways as will occur to the person of skill in the art.

The subject matter of the present disclosure may also be considered to reside in use of apparatus as described herein in the operation of a logging tool to acquire and/or process log information and/or log signals indicative of properties of subterranean rock.

Overall the subject matter of the present disclosure provides significant improvements in the ability of logging tools to provide dielectric constant and other layer property information.

Preferences and options for a given aspect, feature or parameter of the present disclosure should, unless the context indicates otherwise, be regarded as having been disclosed in combination with any and all preferences and options for all other aspects, features, and parameters of the present disclosure.

The listing or discussion of an apparently prior-published document in this specification should not necessarily be taken as an acknowledgement that the document is part of the state of the art or is common general knowledge.

What is claimed is:

1. A reflectometer sensor element, comprising:
a recess formed in an electrically conducting material, the electrically conducting material including a connection portion, the recess including an open end, at or adjacent a surface of the electrically conducting material, that is longitudinally spaced from the connection portion, the recess having a transverse cross-sectional area, defined by at least one wall of the recess, that increases in at least a first region between the connection portion and the open end;
an electrically conducting electrode that is spaced from the at least one wall of the recess and extends between the open end and a location proximate the connection portion; and
one or more dielectric materials occupying at least part of the recess between the at least one wall of the recess and the electrically conducting electrode, wherein the recess defines a central, elongate axis; and wherein the electrically conducting electrode is an elongate element, the elongate axis of which is coaxial with the recess,
the sensor element including one or more fluted recesses extending longitudinally along the electrically conducting electrode.

2. The reflectometer sensor element of claim 1, wherein the electrically conducting material is or includes a substrate of an electrically conducting metal in which the recess is formed.

3. The reflectometer sensor element of claim 1, wherein the connection portion includes a cylindrical bore formed in the electrically conducting material and communicating with the interior of the recess.

4. The reflectometer sensor element of claim 1, wherein the recess includes a cylindrical portion of constant transverse cross-sectional area in a second region extending between the first region and the open end.

5. The reflectometer sensor element of claim 1, wherein the recess in the first region defines a frustum of a cone.

6. The reflectometer sensor element of claim 1, wherein the transverse cross-sectional area of the recess in the first region increases uniformly from the connection portion to the open end.

7. The reflectometer sensor element of claim 1, wherein the electrically conducting electrode includes an outer periphery and includes a plurality of the one or more fluted recesses spaced at equal intervals about the outer periphery.

8. The reflectometer sensor element of claim 1, wherein the cross-sectional shape of the one or more fluted recess is selected from the list comprising triangular, V-section, part-circular or ellipsoidal transverse cross-sectional shape.

9. The reflectometer sensor element of claim 1, wherein the one or more dielectric materials is or includes one or more of a glass, a plastic, a ceramic, a rubber, an epoxy or mica.

10. The reflectometer sensor element of claim 1, wherein the one or more dielectric materials fills the recess between the at least one wall of the recess and the electrically conducting electrode.

11. The reflectometer sensor element of claim 1, wherein the electrically conducting material is electrically connected to and/or forms part of a geological logging tool.

12. The reflectometer sensor element of claim 1, wherein the electrically conducting material is electrically connected to and/or forms part of a geological logging tool; and wherein the electrically conducting material is electrically connected to and/or forms part of a pad of a logging tool that in use is forcibly into contact with a wall of a borehole formed in subterranean rock.

13. The reflectometer sensor element of claim 1, wherein the electrically conducting material is electrically connected to and/or forms part of a mandrel of a logging tool, logging tool string, drilling tool or drill string.

14. The reflectometer sensor element of claim 1, wherein the reflectometer sensor element is operatively connected to one or more electrical or electronic components that are capable of conditioning, analysing and/or transmitting one or more signals, reflected at the reflectometer sensor element, that are indicative of one or more properties of rock.

15. The reflectometer sensor element of claim 1, further comprising a logging tool using the reflectometer sensor element in an operation to acquire and/or process log information and/or one or more log signals indicative of properties of subterranean rock.

\* \* \* \* \*